Sept. 6, 1960
J. MacBLANE, SR
2,951,707
COLLET AND FEED CHUCK
Filed Oct. 29, 1958
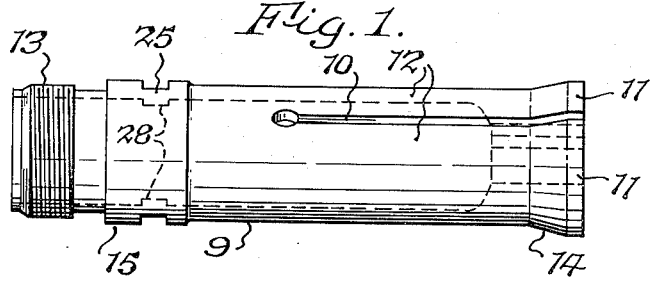
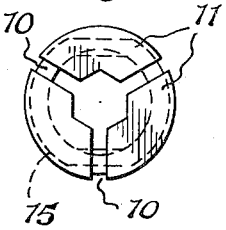
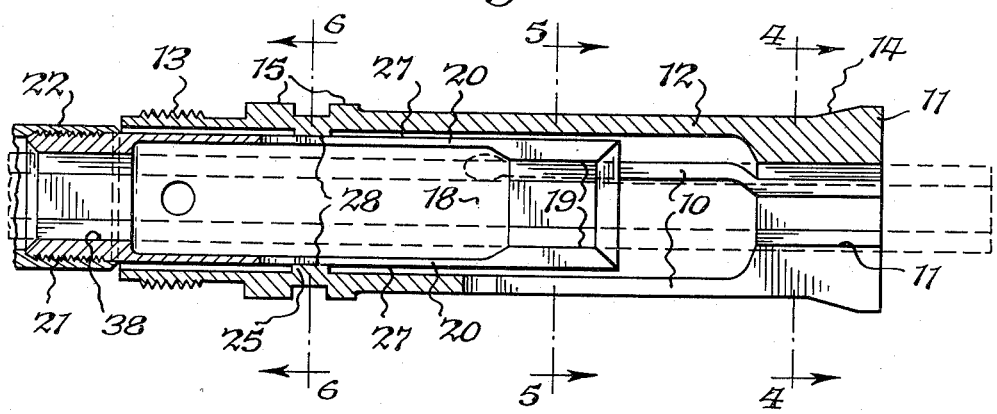
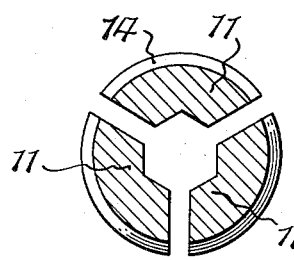
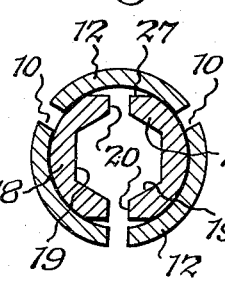
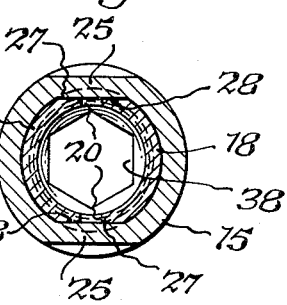
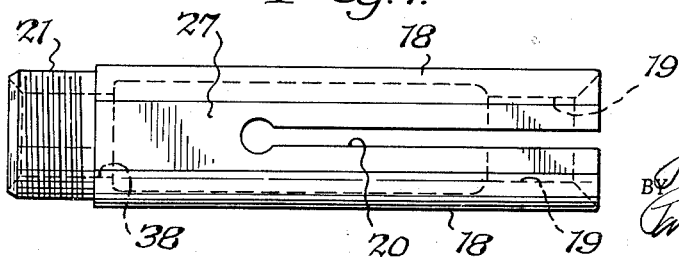
INVENTOR.
James MacBlane, Sr.
BY
Parker & Frochman,
Attorneys.

United States Patent Office 2,951,707
Patented Sept. 6, 1960

2,951,707
COLLET AND FEED CHUCK

James MacBlane, Sr., Horseheads, N.Y., assignor to Hardinge Brothers, Inc., Elmira, N.Y.

Filed Oct. 29, 1958, Ser. No. 770,547

4 Claims. (Cl. 279—41)

This invention relates to an improved combination of collet and feed chuck for use in connection with automatic screw machines, lathes and similar machines.

It has been found very important for producing accurate work to hold the collet and feed chuck in fixed angular relation to each other, particularly when operating on non-circular stock. Heretofore the feed chuck and collet have been secured by threaded connections to tubes which effect the movement of these parts, but this has ordinarily required that the threads, by means of which the collet and chuck are held on the tubes, must be formed with a high degree of accuracy to maintain the correct relation between the thread and the openings between the jaws of the collets and feed chucks, this being particularly the case when the stock to be fed is noncircular in shape.

It is consequently one of the objects of this invention to connect the collet and feed chuck in such a manner that the openings between their jaws will be in correct alignment, and will in no way interfere with the firm gripping of the stock by the collet and feed chuck.

Another object is to provide a sliding connection between a collet and a feed chuck which can be easily formed.

In the accompanying drawings:

Fig. 1 is a side view of a collet used in connection with this invention.

Fig. 2 is an end view thereof.

Fig. 3 is a longitudinal central sectional view of a collet and feed chuck arranged in correct relation to each other.

Figs. 4, 5 and 6 are respectively sectional views on line 4—4, 5—5 and 6—6, Fig. 3.

Fig. 7 is an elevation of a feed chuck removed from the collet.

One form of collet which may be used in connection with my improvements is illustrated by way of example in the drawings, but it will be understood that collets of other constructions may be employed. The collet shown has a substantially tubular body portion 9 provided with a plurality of longitudinally extending slots 10 which form resilient arms or fingers 12 having stock gripping jaws 11 formed at the outer ends thereof, three slots and three jaws being shown in the construction illustrated, but the number of slots and jaws may vary as desired. The other end of the chuck is provided with external screw threads 13 which when the collet is in use are secured to a collet tube, not shown, by means of which the collet may be moved in the direction of its length so that the external tapering surfaces 14 may cooperate with a corresponding internal surface for moving the jaws toward each other against the action of the spring to clamp the stock or work piece. The resiliency of the spring fingers 12 between the slots 10 is such as to urge the jaws away from each other to release the work. The collet also has the usual bearing portion 15 which cooperates with a corresponding bearing portion in the head stock of a screw machine or lathe.

The feed chuck is also of hollow tubular form and is provided with slots 20 extending from the outer end thereof inwardly beyond the middle portion of the feed chuck to form spring fingers or arms 18 with jaws 19 on the outer ends thereof. The spring fingers in this case urge the jaws 19 at all times toward each other into gripping contact with the stock on which the machine operates. The other end of the feed chuck is screw threaded as shown at 21 for cooperation with a feed chuck tube 22.

The jaws of both the collet and the feed chuck are constructed to form openings between them for receiving stock of any desired cross sectional shape. In the construction illustrated by way of example, the openings between the jaws are of hexagonal form to cooperate with stock of hexagonal cross section. It will, of course, be obvious that in order to properly feed any non-circular stock, it is necessary not only to make openings between the jaws of the collet and feed chuck of a dimension corresponding to the stock to be fed, but also in the case of polygonal stock to make certain that the corners and edges of the openings in the jaws be in accurate alignment with each other. This can best be accomplished by providing an accurately made keyed or other connection between the collet and the feed chuck which holds the collet and feed chuck in accurate angular relation to each other and which prevents any turning or angular displacement of one relatively to the other. In the construction shown for this purpose, I have provided the collet with inwardly extending straight portions 25 at opposite sides thereof and the feed chuck is provided at opposite sides thereof with flat faces 27. The inwardly extending portions 25 are preferably made by pressing the metal of the collet inwardly to form interior flat faces 28 which can be made to fit accurately on the flat faces 27 of the feed chuck. Preferably the inwardly extending portions 25 are pressed inwardly at the back bearing 15, so that these portions 25 are spaced far from the slots 10 and do not interfere with the spring action of the jaws of the collet. Also the feed chuck preferably has an even number of slots and the flat faces 27 are formed to extend directly across two slots, so that these flat faces do not interfere with the movement of the jaws or spring fingers of the feed chuck relatively to each other, since such movements will be lengthwise of the flat faces.

By means of the construction described, the meeting flat faces of the collet and feed chuck, when accurately positioned on these parts, will keep the corners of a polygonal opening between the jaws of the collet in correct alignment with the corresponding corners of the feed chuck. When the collet and feed chuck are keyed together in this manner, several advantages are obtained. In the first place, the feeding of stock other than round shapes is made easy because the alignment through the collet and feed chuck is maintained. When working on hexagon stock without the keyed feature herein described, then when the collet opens due to the spread of the jaws of the collet, the stock can revolve in the collet, and when the jaws are again brought together, they may engage across the corners of the hexagon stock instead of on the flat surfaces, which cannot happen with my improved construction. When a bar of stock is almost used up and the feed chuck has to re-engage the short piece of stock, it is possible in prior constructions that it may re-engage across the corners, thus damaging the feed chuck. This also cannot happen with my construction. Even on stock of circular cross section, wear on the opening between the jaws of the collet can result in a change in relative speed of the collet and a freely floating feed chuck when the collet opens. This also cannot happen with the construction herein described so that my improved construction results in longer wear of the collet and feed chuck.

The construction shown has the further advantage that the flat surfaces 28 of the collet do not tend in any manner to cause the jaws of the feed chuck to open, due to any twisting motion of the stock, so that the stock is firmly gripped at all times by the feed chuck.

To insure correct feeding of non-circular stock into the combined collet and feed chuck, the feed chuck is provided at the inner end thereof with an opening 38 of cross sectional shape to correspond with the opening between the jaws 19 and also arranged in similar angular relation to the axis of the feed chuck as the opening between the jaws 19. The stock shown by way of example in Fig. 3 can therefore be fed to the feed chuck only in correct relation to the same and to the collet.

It will be understood that various changes in the details, materials and arrangements of parts which have been hereindescribed and illustrated in order to explain the nature of the invention may be made by those skilled in the art, within the principle and scope of the invention as expressed in the appended claims.

I claim:

1. The combination of a collet having longitudinal slots forming spring arms having stock-gripping jaws on their outer ends, said jaws gripping the stock when closed and permitting stock to fed between said jaws when open, a feed chuck having spring jaws which grip the stock and which are slidable on the stock when moving in one direction and advance the stock to the collet when moving in the opposite direction and when the collet jaws are open, said feed chuck being arranged to extend partly into said collet and to slide back and forth relatively to said collet, said collect having a flat face on the interior thereof beyond the inner ends of said slots and said feed chuck having a flat face on the exterior thereof, said flat faces being in contact to aline the jaws of both the collet and the feed chuck with the stock to be operated upon.

2. A combination of collet and feed chuck according to claim 1 in which said collet has an external back bearing and in which said flat face is formed by metal extending inwardly from said back bearing.

3. A combination of collet and feed chuck according to claim 1 in which said feed chuck has an even number of spring arms spaced from each other by slots and having jaws at the outer ends thereof, said flat face on the exterior of said feed chuck extending directly crosswise of one of said slots so that the movement of said jaws and spring arms toward and from each other will be lengthwise of said flat faces to permit said jaws of said feed chuck to move relatively to each other and relatively to said flat face of said collet.

4. A combination collet and feed chuck according to claim 1 for use with stock of non-circular cross section, in which said feed chuck at the outer end thereof is provided with an opening between its jaws corresponding to the shape of the stock to be operated on and in which the feed chuck at the work-received end thereof is provided with an opening of similar shape and angular relation to said opening between said jaws for ensuring correct passage of the stock to said opening between said jaws, said cooperating flat faces holding said openings between said jaws in alinement and against moving relatively to each other about the axis of said collet and feed chuck.

References Cited in the file of this patent

UNITED STATES PATENTS

| | | |
|---|---|---|
| 2,773,694 | Von Pechmann | Dec. 11, 1956 |
| 2,895,740 | Parsons | July 21, 1959 |